United States Patent
Siebert

(10) Patent No.: US 7,983,348 B2
(45) Date of Patent: Jul. 19, 2011

(54) SYSTEM AND METHOD FOR SIGNAL TRANSMISSION

(75) Inventor: Harry Siebert, Puchheim (DE)

(73) Assignee: Infineon Technologies AG, Neubiberg (DE)

( * ) Notice: Subject to any disclaimer, the term of this patent is extended or adjusted under 35 U.S.C. 154(b) by 1191 days.

(21) Appl. No.: 11/674,819

(22) Filed: Feb. 14, 2007

(65) Prior Publication Data

US 2007/0195895 A1 Aug. 23, 2007

(30) Foreign Application Priority Data

Feb. 14, 2006 (DE) .......................... 10 2006 006 833

(51) Int. Cl.
*H04L 27/00* (2006.01)

(52) U.S. Cl. ......... 375/259; 375/295; 375/316; 375/244

(58) Field of Classification Search .................. 375/259, 375/354, 271, 295, 316, 244
See application file for complete search history.

(56) References Cited

U.S. PATENT DOCUMENTS

| | | | | |
|---|---|---|---|---|
| 5,095,309 A | * | 3/1992 | Troyk et al. | 340/10.3 |
| 5,142,556 A | * | 8/1992 | Ito | 375/354 |
| 6,070,211 A | * | 5/2000 | Neal et al. | 710/106 |
| 6,956,920 B1 | | 10/2005 | Veenstra et al. | |
| 6,958,933 B2 | * | 10/2005 | Smith et al. | 365/171 |
| 2002/0169915 A1 | * | 11/2002 | Wu | 710/305 |
| 2004/0160253 A1 | | 8/2004 | Le et al. | |
| 2005/0200731 A1 | * | 9/2005 | Beck et al. | 348/243 |

FOREIGN PATENT DOCUMENTS

DE   10 2004 005 681   8/2004

* cited by examiner

*Primary Examiner* — Chieh M Fan
*Assistant Examiner* — Leila Malek
(74) *Attorney, Agent, or Firm* — Dicke, Billing & Czaja, PLLC

(57) ABSTRACT

A system and method for signal transmission, a signal modulation and a signal demodulation device, and a method for signal transmission are disclosed. One embodiment includes transmitting a first pulse signal via a first line; and transmitting a second pulse signal complementary to the first pulse signal via a second line, wherein the point in time of the transmitting of the second signal relative to the point in time of the transmitting of the first signal is varied as a function of the respective digital data to be transmitted.

21 Claims, 3 Drawing Sheets

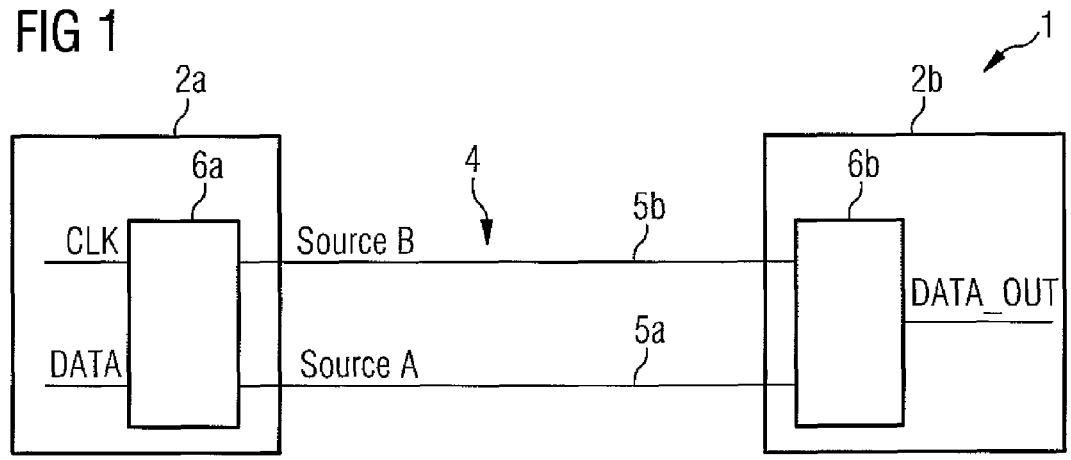
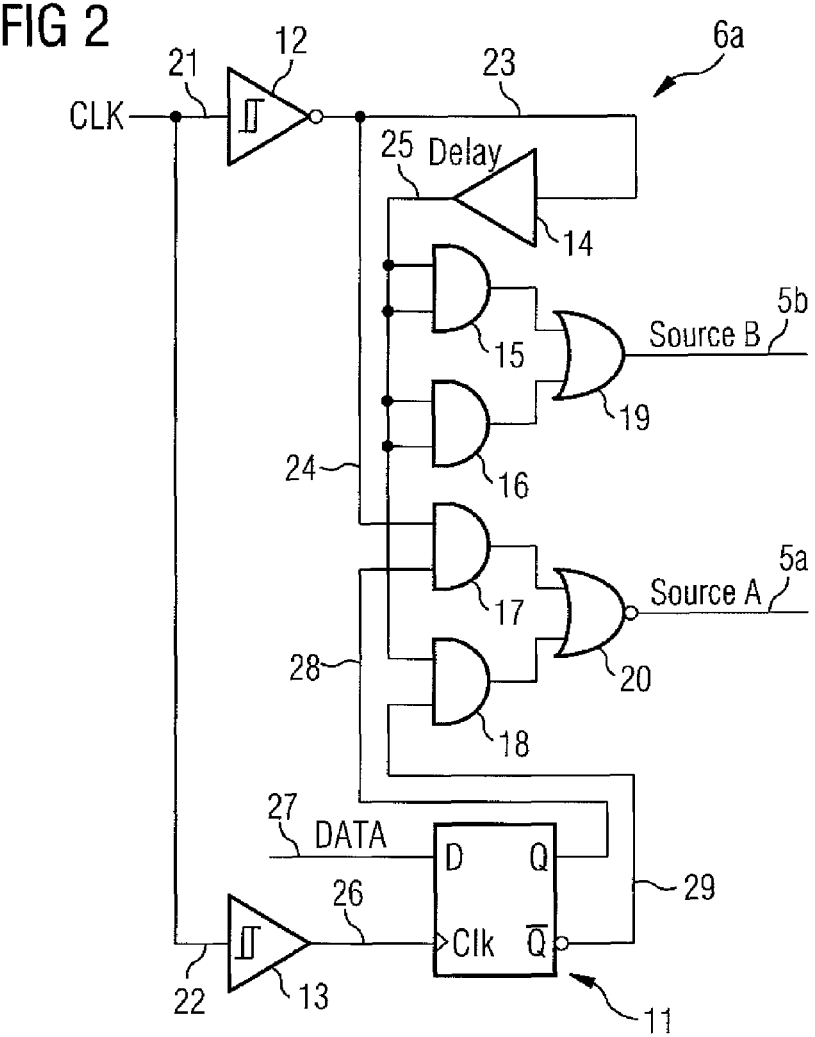

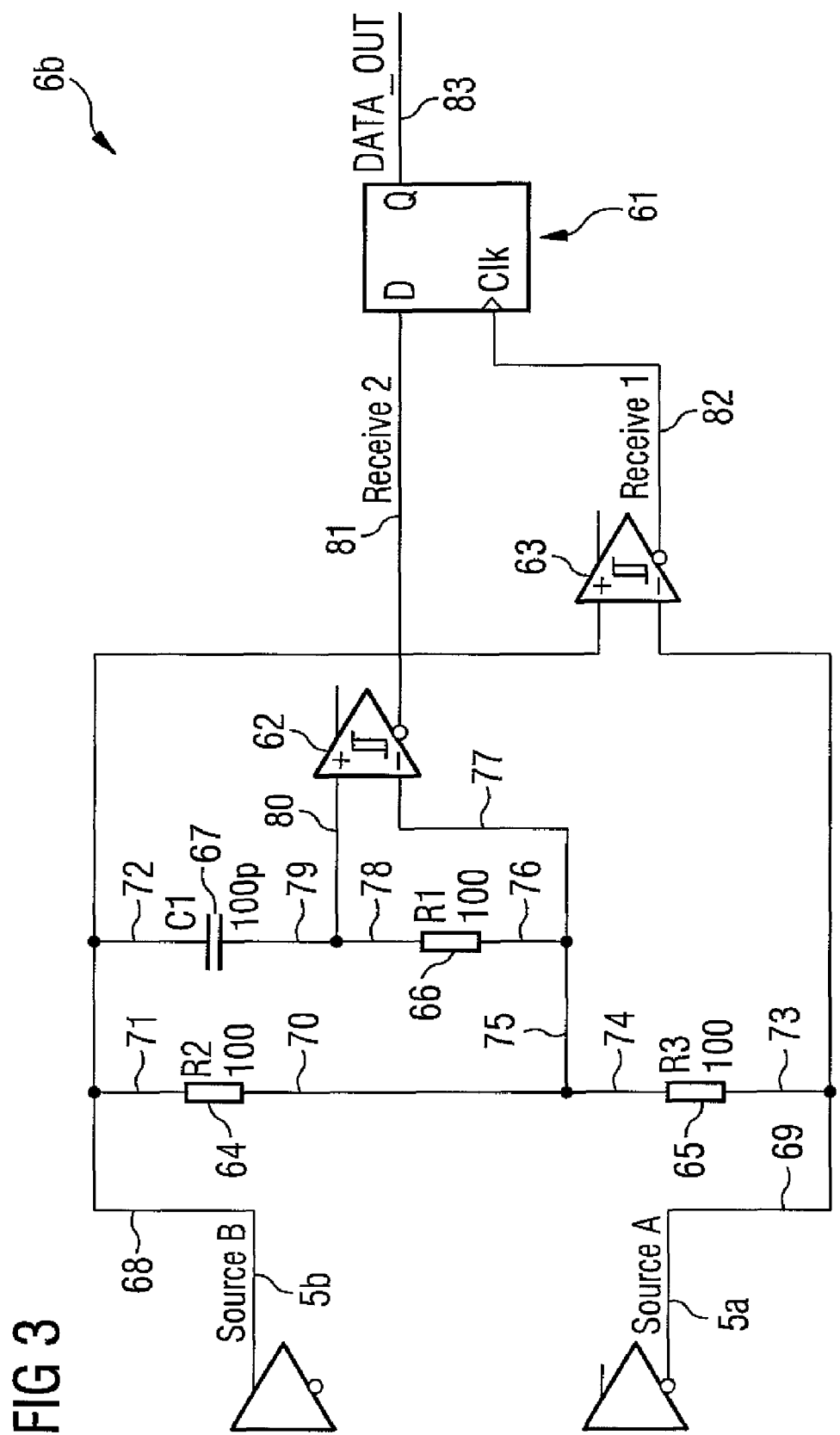

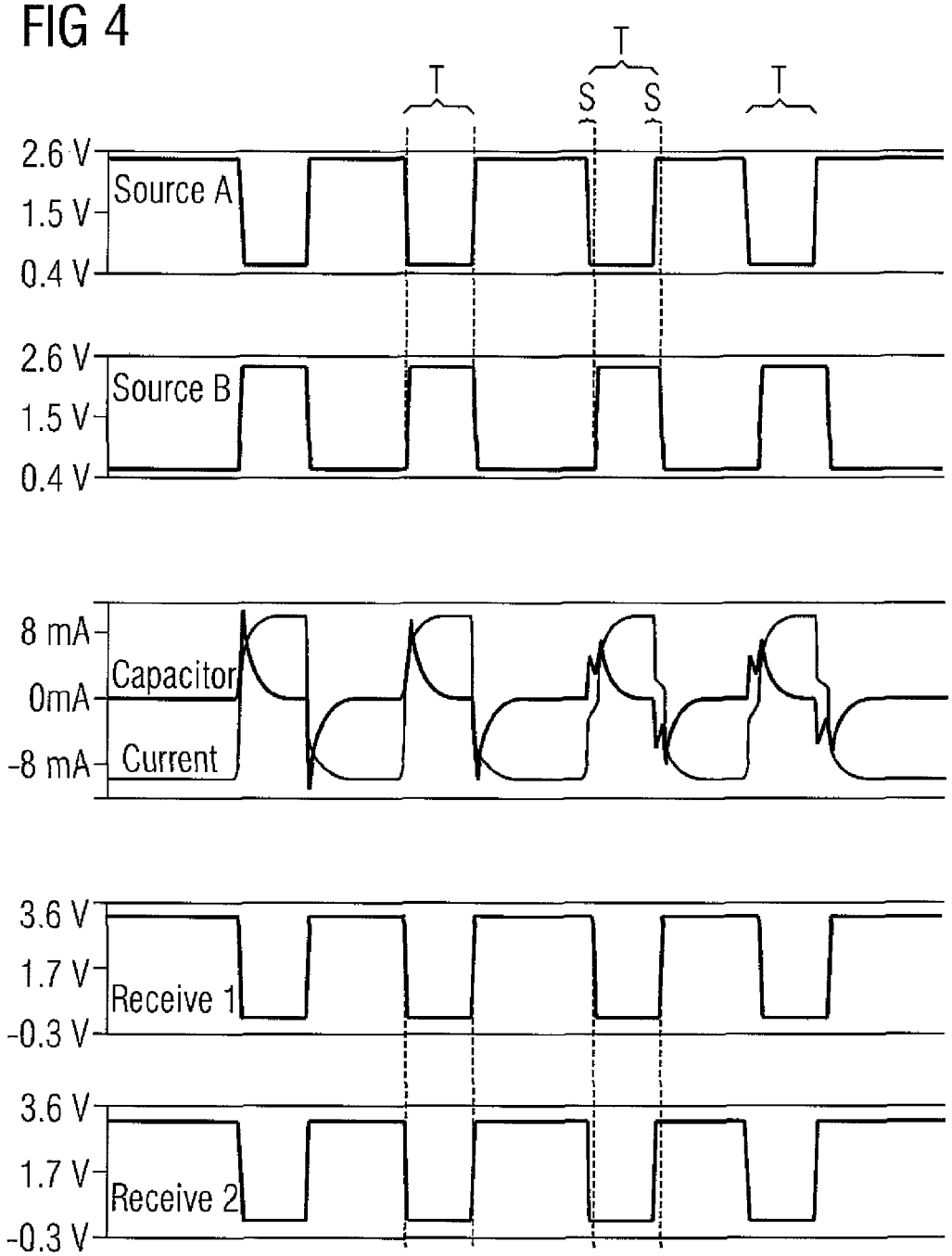

SYSTEM AND METHOD FOR SIGNAL TRANSMISSION

CROSS-REFERENCE TO RELATED APPLICATIONS

This Utility Patent Application claims priority to German Patent Application No. DE 10 2006 006 833.5 filed on Feb. 14, 2006, which is incorporated herein by reference.

BACKGROUND

The invention relates to a system and method for signal transmission, including the transmission of differential signals, and to a signal modulation and a signal demodulation device.

In electric or electronic systems, individual system modules, e.g., different electronic components, different electronic devices arranged on a single component (e.g., different semiconductor devices arranged on a single component), different device subcomponents provided in one and the same device (in particular different components of a semiconductor device), etc. communicate via a transmission medium consisting of one or a plurality of transmission lines, for instance, a bus system.

Bus systems may be used jointly by several, in particular by more than two system modules, and may, for instance, consist of several partial systems, e.g., of a data bus for the transmission of the actual payload, and/or an address bus for the transmission of address data, and/or a control bus for the transmission of control data, etc.

Between the individual system modules (e.g., between individual semiconductor devices (for instance, a DRAM (DRAM=Dynamic Random Access Memory or dynamic read-write memory) and a DRAM controller; a microcontroller or microprocessor and a further device, etc.)), the respective data can always be transmitted in two different ways, namely either by a single line (i.e. in a "single-wired" manner), or e.g., by a line pair (i.e. in a "double-wired" manner).

Both in the case of the single-wired and the double-wired transmission of data the effort is usually made to terminate the line or the lines, respectively, at the respectively receiving module with a (termination) resistor R that is identical to the impedance $Z_W$ of the line(s) ("line adaptation"). Thus, the line losses and (undesired) signal reflections can be minimized.

The transmission of data via corresponding line pairs ("two-wired data transmission") is generally performed by differential or symmetric signals that are output by corresponding interface circuit arrangements provided in the respective system module, e.g., by signals corresponding to the LVDS (Low Voltage Differential Signaling) standard ANSI TIA/EIA-644.

For applying the corresponding differential or symmetric signals to a line pair, two—cooperating—voltage or current sources may be provided in the respective interface circuit arrangement at the module acting as transmission module.

The first voltage source of the interface circuit arrangement may, for instance, be connected between a first line of the line pair and the ground (or a corresponding bias), and the second voltage source may be connected with the second line of the line pair, and—also—with the ground (or a corresponding bias).

If the first voltage source outputs a "high-level signal" (i.e., for instance, a voltage of $U_{S1} \approx 2.5$ V), the second voltage source—simultaneously—outputs a "low-level" signal (i.e., for instance, a voltage of $U_{S2} \approx 0.5$ V).

Vice versa, if the first voltage source outputs a "low-level signal" (i.e., for instance, a voltage of $U_{S1} \approx 0.5$ V), the second voltage source—simultaneously—outputs a "high-level" signal (i.e., for instance, a voltage of $U_{S2} \approx 2.5$ V).

This way, digital data may be transmitted via the line pair from the transmitting to the receiving module (e.g., voltage intensities of $U_{S1}=2.5$ V and $U_{S2}=0.5$ V correspond, for instance, to a transmitted "1", and voltage intensities of $U_{S1}=0.5$ V and $U_{S2}=2.5$ V to a transmitted "0" (or vice versa)).

The applying of the above-mentioned voltages results in a corresponding current flow either from the first voltage source ("source A")—via the line pair—to the second voltage source ("source B"), or vice versa from the second voltage source ("source B")—via the line pair—to the first voltage source ("source A"), and thus in a corresponding positive or negative voltage drop at the (termination) resistor provided at the receiving module.

By sensing the respective voltage drop occurring at the (termination) resistor it can thus be determined whether a "1" or a "0" was transmitted via the line pair.

As a rule, for the transmission of data (payload, address data, control data) by corresponding differential or symmetric signals—in addition to one or several line pairs that direct the actual data—at least one further line pair is required via which a corresponding (differential) clock signal is transmitted, i.e. corresponding timing data.

By corresponding state changes of the differential clock signal transmitted via the clock line pair, the points in time can be determined at which the voltage drop at the receiving module is to be sensed at the (termination) resistor provided for the data line pair directing the actual data.

For these and other reasons, there is a need for the present invention.

SUMMARY

One embodiment provides a method for signal transmission, including transmitting a first pulse signal via a first line. A a second pulse signal complementary to the first pulse signal is transmitted via a second line. The point in time of the transmitting of the second signal relative to the point in time of the transmitting of the first signal is varied as a function of the respective digital data to be transmitted.

BRIEF DESCRIPTION OF THE DRAWINGS

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

FIG. 1 illustrates a schematic representation of an electronic system with communicating system modules in accordance with an embodiment of the invention.

FIG. 2 illustrates a schematic detailed representation of a modulation circuit arrangement provided in a first system module of the electronic system.

FIG. 3 illustrates a schematic detailed representation of a demodulation circuit arrangement provided in a second system module of the electronic system.

FIG. 4 illustrates a timing diagram of signals occurring in the electronic system according to FIG. 1.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

The invention provides a system and method for signal transmission, in particular for the transmission of differential signals, as well as a signal modulation and a signal demodulation device, by which the number of lines or line pairs required for signal transmission can be reduced.

One embodiment provides a method for signal transmission, including:
transmitting a first pulse signal via a first line;
transmitting a second pulse signal complementary to the first pulse signal via a second line, wherein the point in time of the transmitting of the second signal relative to the point in time of the transmitting of the first signal is varied as a function of the respective digital data to be transmitted.

Another embodiment, provides a signal demodulation device having a first device for sensing a voltage present between the first and second lines, and a second device for sensing a voltage indicating a change of the voltage present between the first and second lines.

FIG. 1 illustrates a schematic representation of an electronic system 1 with a plurality of communicating system modules 2a, 2b in accordance with a first embodiment of the invention.

In one embodiment, the system modules 2a, 2b may, for instance, be electronic devices 2a, 2b arranged on one and the same component or circuit board 3, in particular semiconductor devices 2a, 2b or microchips 2a, 2b.

The first system module 2a may, for instance, be a DRAM device (DRAM=Dynamic Random Access Memory or dynamic read-write memory), and the second system module 2b a DRAM controller device (or vice versa), or e.g., an interface device, or e.g., the first system module 2a a microcontroller or microprocessor, and the second system module 2b a further device communicating therewith, e.g., a memory device (or vice versa), etc.

The system modules 2a, 2b may, for instance, be different, communicating electronic components or circuit boards 2a, 2b, or e.g., different, communicating device subcomponents 2a, 2b provided in one and the same semiconductor device (e.g., a memory unit 2a and a computing unit 2b (in particular CPU (Central Processing Unit)) of one and the same microchip).

The two system modules 2a, 2b communicate via a line pair 4 consisting of a first line 5a and a second line 5b.

The lines 5a, 5b of the line pair 4 may, for instance, be of similar or identical design as conventional lines of a line pair used for two-wired data transmission, or may be designed in any other manner, e.g., correspondingly similar or identical as lines used for the transmission of differential or symmetric signals in accordance with the LVDS (Low Voltage Differential Signaling) standard ANSI TIA/EIA-644.

Apart via the line pair 4, the two system modules 2a, 2b may additionally be connected with each other via one or a plurality of further line pairs (not illustrated), via which, in a corresponding, specific manner that will be explained in detail further below, data are exchanged between the system modules 2a, 2b like via the line pair 4 (and/or via one or a plurality of additional line pairs and/or single lines via which a—conventional—data exchange takes place).

The first system module 2a may—except with the second system module 2b—, and/or the second system module 2b may—except with the first system module 2a—additionally communicate with further system modules (not illustrated for clarity), For example, via the line pair 4 or via one or a plurality of further line pairs (wherein the above-mentioned line pair 4 and the one or the plurality of further line pairs may form a bus system that is jointly used by a plurality of system modules (or part of such a bus system), and wherein the line pair 4 may be connected with the one or the plurality of further line pairs).

As is illustrated in FIG. 1, the first system module 2a includes a modulation circuit arrangement 6a that serves to transmit data ("DATA") generated in the first system module 2a (or in a further module)—via the line pair 4—to the second system module 2b (in particular to a demodulation circuit arrangement 6b provided there), in one embodiment, by a first source driver ("source B") connected with the first line 5b of the line pair 4, and a second source driver ("source A") connected with the second line 5a of the line pair 4.

The second system module 2b may—like the first system module 2a—include a modulation circuit arrangement corresponding to the modulation circuit arrangement 6a provided in the first system module 2a, and the first system module 2a—like the second system module 2b—a demodulation circuit arrangement corresponding to the demodulation circuit arrangement 6b provided in the second system module 2b.

Thus, inversely as described above, in one manner explained in more detail further below, data generated in the second system module 2b (or in a further module) can additionally also be transmitted via the corresponding modulation circuit arrangement to the first system module 2a (or to the corresponding demodulation circuit arrangement provided there (e.g., via a further line pair)).

The data ("DATA") to be transmitted from the first system module 2a to the second system module 2b (or vice versa) may basically be any data, e.g., (actual) payload, and/or address data, and/or control data.

As will be explained in more detail in the following, in one data transmitting method used in the present embodiment—other than with conventional methods based on double-wired data transmission (e.g., with the data transmitting method corresponding to the above-mentioned LVDS standard) no respective separate line pairs are used for transmitting the above-mentioned data (payload/address data/control data) and for transmitting timing data (i.e. no separate clock and data line pairs).

Instead, both the above-mentioned data (payload/address data/control data)—"DATA"—and corresponding timing data—"CLK"—are transmitted via the above-mentioned line pair 4.

To this end—as will be explained in more detail in the following—the data to be transmitted ("DATA") are modulated on the above-mentioned timing data ("CLK") by the modulation circuit arrangement 6a.

For modulation—other than with conventional differential data or clock signals—the respective levels of the signals output by the sources A, B connected with the lines 5a, 5b of the line pair 4 are not always changed simultaneously.

Instead, for instance, if a "0" is to be transmitted as data ("DATA") via the line pair 4, the levels of the signals output by the sources A, B connected with the lines 5a, 5b of the line pair 4 may—as conventionally—be changed simultaneously (e.g.,—as illustrated in FIG. 4—from $U_{S1} \approx 2.5$ V ("high-level signal") to $U_{S1} \approx 0.5$ V ("low-level signal"), and back to $U_{S1} \approx 2.5$ V (source A), and vice versa from $U_{S2} \approx 0.5$ V to $U_{S2} \approx 2.5$ V, and back to $U_{S2} \approx 0.5$ V (source B)).

If instead a "1" is to be transmitted as data ("DATA") via the line pair 4, the levels of the signals output by the sources A, B connected with the lines 5a, 5b of the line pair 4 may—other than conventionally—not be changed simultaneously, but e.g., the level of the signal output by the source A connected with the line 5a of the line pair 4 somewhat earlier than the level of the signal output by the source B connected with the line 5b of the line pair 4 (alternatively, the level of the signal output by the source B connected with the line 5b of the line pair 4 may instead be changed somewhat earlier than the level of the source A connected with the line 5a of the line pair 4).

The level change may again be performed—as illustrated in FIG. 4—e.g., from $U_{S1} \approx 2.5$ V to $U_{S1} \approx 0.5$ V, and back to $U_{S1} \approx 2.5$ V (source A), and vice versa from $U_{S2} \approx 0.5$ V to $U_{S2} \approx 2.5$ V, and back to $U_{S2} \approx 0.5$ V (source B).

In a further alternative, for instance, in the case of a "1" to be transmitted as data ("DATA") via the line pair 4, the levels of the signals output by the sources A, B connected with the lines 5a, 5b of the line pair 4 may—as conventionally—be changed simultaneously, and in the case of a "0" to be transmitted as data ("DATA") via the line pair 4, the level of the signal output by the source A connected with the line 5a of the line pair 4 may, for instance—other than conventional—be changed somewhat earlier than the level of the signal output by the source B connected with the line 5b of the line pair 4 (or vice versa).

The time difference between the level changes of the signals output by the sources A and B caused by the early level change of the signal output by the source A connected with the line 5a of the line pair 4 (or the signal output by the source B connected with the line 5b of the line pair 4) may, for instance, range between 1 ns and 10 ns, e.g., between 2 ns and 6 ns, and may especially be smaller than 5 ns.

As results from FIG. 4, the pulse durations T of the signal pulses output by the sources A, B are independent of the respective data to be transmitted ("DATA"); the signals, however, have—as results from the statements above—either a—deliberately caused—skew s (e.g., between 1 ns and 10 ns, or between 2 ns and 6 ns, especially smaller than 5 ns), or—substantially—no skew (or a "rest" skew of, for instance, smaller than 0.5 ns—which can never be completely avoided).

In other words, the signal pulses output by the source A, or alternatively the signal pulses output by the source B are—as a function of the respective data to be transmitted ("DATA")—subject to a corresponding phase modulation.

FIG. 2 illustrates a schematic detailed representation of the modulation circuit arrangement 6a provided in the first system module 2a of the electronic system.

The modulation circuit arrangement 6a includes an edge-triggered flip-flop 11 and first and second driver circuits 12, 13, a delay element 14, a plurality of AND gates 15, 16, 17, 18, an OR gate 19, and a NOR gate 20.

As results from FIG. 2, the timing data ("CLK") to be modulated as a function of the data ("DATA") to be transmitted (here: a clock signal CLK corresponding to a conventional clock signal) are transmitted to the first driver circuit 12 via a line 21 and to the second driver circuit 13 via a line 22.

The first and second driver circuits 12, 13 may be constructed correspondingly similar or identical to conventional driver circuits used in known source drivers for the transmission of differential signals and—in particular—have a corresponding hysteresis (i.e. a corresponding difference between switch-on and switch-off level).

The—inverting—output of the first driver circuit 12 is, via a line 23, connected with the input of the delay element 14 and, via a line 24, with a first input of the AND gate 17.

The output of the delay element 14 is, via a line 25, connected with the two inputs of the AND gate 15, and with the two inputs of the AND gate 16, and with a first input of the AND gate 18.

The signal delay caused by the delay element 14 may, for instance, be between 1 ns and 10 ns, or between 2 ns and 6 ns, especially be smaller than 5 ns, i.e. be as large as the above-mentioned skew caused possibly deliberately as a function of the respective data to be transmitted ("DATA").

The output of the AND gate 15 is connected with a first input of the OR gate 19; the output of the AND gate 16 is connected to a second input of the OR gate 19.

The output of the AND gate 17 is connected with a first input of the NOR gate 20, and the output of the AND gate 18 with a second input of the NOR gate 20.

The output of the OR gate 19 is connected to the line 5b of the above-mentioned line pair 4 and—correspondingly—the output of the NOR gate 20 to the—other—line 5a of the line pair 4.

As results further from FIG. 2, the output of the second driver circuit 13 is, via a line 26, connected with the clock input of the edge-triggered flip-flop 11.

The data to be transmitted ("DATA") (here: a corresponding digital data signal DATA) are applied to the data input D of the edge-triggered flip-flop 11 via a line 27.

The (first) data output Q of the edge-triggered flip-flop 11 is connected to a second input of the AND gate 17 via a line 28.

The second—inverse—data output/Q of the edge-triggered flip-flop 11 is connected to a second input of the AND gate 18 via a line 29.

As results from FIG. 2, the clock signal CLK present at the line 21 is always—i.e. independently of the data to be transmitted ("DATA")—transmitted to the line 5b with the—additional—signal delay caused by the delay element 14 (namely—always—via the receiver circuit 12, the line 23, the delay element 14, the line 25, the AND gates 15, 16, and the OR gate 19) ("source B").

Contrary to this, the clock signal CLK present at the line 21 is—as a function of the data to be transmitted ("DATA")—transmitted to the line 5b either with the—additional—signal delay caused by the delay element 14 (namely via the receiver circuit 12, the line 23, the delay element 14, the line 25, the AND gate 18, and the NOR gate 20), or without the—additional—signal delay caused by the delay element 14 (namely via the receiver circuit 12, the line 24, the AND gate 17, and the NOR gate 20).

A transmission without the—additional—signal delay caused by the delay element 14 (i.e. a transmission via the line 24 and the first input of the AND gate 17) is performed if a "1" is present at the second input of the AND gate 17—i.e. at the line 28 (and a "0" at the second input of the AND gate 18—i.e. at the line 29).

This is the case if a "1" is output at the first non-inverse data output Q of the edge-triggered flip-flop 11—i.e. if a "1" is present as data to be transmitted ("DATA") at the data input D of the edge-triggered flip-flop 11.

Contrary to this, the transmission of the clock signal CLK to the line 5a is performed with the—additional—signal delay caused by the delay element 14 (i.e. a transmission via the line 23, the delay element 14, the line 25, and the first input of the AND gate 18) if a "1" is present at the second input of the AND gate 18—i.e. at the line 29 (and a "0" at the second input of the AND gate 17—i.e. at the line 28).

This is the case if a "1" is output at the second—inverse—data output/Q of the edge-triggered flip-flop 11—i.e. if a "0" is present as data to be transmitted ("DATA") at the data input D of the edge-triggered flip-flop 11.

By the use of a NOR gate 20 for transmitting the clock signal CLK to the line 5a instead of an OR gate 19 for transmitting the clock signal CLK to the line 5b it is achieved that the signal output at the line 5a is inverse to the signal output at the line 5b (cf. FIG. 4).

FIG. 3 is a schematic detailed representation of the demodulation circuit arrangement 6b provided in the second system module 2b of the electronic system.

The demodulation circuit arrangement 6b includes an edge-triggered flip-flop 61 and first and second receiver circuits 62, 63, a plurality of resistors 64, 65, 66, and a capacitor 67.

The first and second receiver circuits 62, 63 may be constructed correspondingly similar or identical to conventional receiver circuits used in known source receivers for receiving differential signals and may—in particular—have a corresponding hysteresis (i.e. a corresponding difference between switch-on and switch-off level).

As results from FIG. 3, the signal received at the line 5b (i.e. the signal received by the "source B" of the modulation circuit arrangement 6a illustrated in FIG. 2) is, via a line 68, fed—directly—to a plus input of the first receiver circuit 63, and the signal received at the line 5a (i.e. the signal received by the "source A" of the modulation circuit arrangement 6a illustrated in FIG. 2) via a line 69—directly—to a minus input of the first receiver circuit 63.

Furthermore, the signal ("source B" signal) received at the line 5b is, via the line 68 and a line 71, transmitted to the resistor 64 and, via a line 72, to the capacitor 67.

The signal ("source A" signal) received at the line 5a is, via the line 69 and a line 73, transmitted to the resistor 65.

The resistor 65 is, via a line 74 and a line 70, connected with the resistor 64 and, via the line 74, a line 75, and a line 76, with the resistor 66 and, via the line 74, the line 75, and a line 77, with a minus input of the second receiver circuit 62.

The resistor 66 is, via a line 78 and a line 79, connected with the capacitor 67. The capacitor 67 and the resistor 66 are, via the line 79 or 78, respectively, and a line 80, connected with the plus input of the second receiver circuit 62.

As results further from FIG. 3, the—inverting—output of the second receiver circuit 62 (at which a signal "Receive 2" is output) is, via a line 81, connected with the data input D of the edge-triggered flip-flop 61.

The—inverting—output of the first receiver circuit 63 (at which a signal "Receive 1" is output) is, via a line 82, connected with the clock input CLK of the edge-triggered flip-flop 61.

The (non-inverse) data output Q of the edge-triggered flip-flop 61 is connected with an output line 83 at which an output signal representing the output data ("DATA_OUT") can be tapped.

A level change of the source A connected with the line 5a of the line pair 4 and of the source B connected with the line 5b of the line pair 4 (from $U_{S1} \approx 2.5$ V to $U_{S1} \approx 0.5$ V, or vice versa) results in an inversion of the direction of the current flow through the termination circuit including the resistors 64, 65, 66 and the capacitor 67.

This results in a corresponding positive or negative voltage drop at the termination circuit—including the resistors 64, 65, 66, and the capacitor 67—, the voltage drop being sensed by the first receiver circuit 63.

Since the first receiver circuit 63 senses the total voltage dropping altogether across the termination circuit (i.e. the voltage between the lines 68, 69), the time progression of the signal ("Receive 1") output by the first receiver circuit 63 is independent of whether the signal pulses output by the sources A, B were transmitted with or without skew (i.e. independent of the respectively transmitted data ("DATA")).

Only if both signal pulses output by the sources A, B have completely performed a corresponding state change (from $U_{S1} \approx 2.5$ V to $U_{S1} \approx 0.5$ V, or vice versa) is the voltage change across the termination circuit large enough that the corresponding switch-on or switch-off level of the first receiver circuit 63 is exceeded or underrun, respectively, so that a state change of the signal ("Receive 1") output by the first receiver circuit 63 is caused.

By the first receiver circuit 63 or of the signal ("Receive 1") output by it, respectively, the clock signal CLK input in the modulation circuit arrangement 6a illustrated in FIG. 2, or the signal pulses output by the source B, respectively, are thus reconstructed (cf. FIG. 4)—i.e. the timing data.

As results from FIG. 3, the voltage dropping across the resistor 66 is sensed by the second receiver circuit 62. This voltage results from the total voltage dropping between the lines 68, 69 minus the voltages dropping across the resistor 65 and across the capacitor 67.

Whenever a level change of the source A connected with the line 5a of the line pair 4 or the source B connected with the line 5b of the line pair 4 occurs (e.g., from $U_{S1} \approx 2.5$ V to $U_{S1} \approx 0.5$ V, or vice versa), a current flow through the capacitor 67 takes place (cf FIG. 4), and thus also through the resistor 66.

Thus—with an appropriate dimensioning of the capacitor 67 and the resistors 66, 64, 65—, a voltage change is caused across the resistor 66 which is large enough that the corresponding switch-on or switch-off level of the second receiver circuit 62 is exceeded or underrun, respectively, so that a state change of the signal ("Receive 2") output by the second receiver circuit 62 is caused (cf. FIG. 4).

The capacitance of the capacitor 67 may, for instance, be approx. 100 pF, and the ohmic resistance of the resistors 66, 64, 65, for instance, each approx. 100Ω.

If the signal pulses output by the sources A, B were output with skew, a state change of the signal ("Receive 2") output by the second receiver circuit 62 takes—with an appropriate dimensioning of the capacitor 67 and the resistors 66, 64, 65—place already when the first of the two signal pulses changes its state—i.e. prior to the state change of the signal ("Receive 1") output by the first receiver circuit 63 (cf. FIG. 4).

If, contrary to this, the signal pulses output by the sources A, B were output without skew, a state change of the signal ("Receive 2") output by the second receiver circuit 62 only takes place when the signal ("Receive 1") output by the first receiver circuit 63 also changes its state (cf. FIG. 4).

Depending on whether, at the point in time at which the signal ("Receive 1") output by the first receiver circuit 63 changes its state (i.e. at the sensing time of the flip-flop 61), the signal ("Receive 2") output by the second receiver circuit 62 has already changed its state or not (i.e. depending on whether the signal pulses output by the sources A, B were output with or without skew), a "1" or a "0" is output at the data output Q of the flip-flop 61.

By the signal DATA_OUT output by the flip-flop 61 at the output line 83, the data signal DATA input in the modulation circuit arrangement 6a illustrated in FIG. 2 is thus reconstructed, or it can be determined, respectively, whether a "1" or a "0" was transmitted via the line pair 4.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method for signal transmission, comprising:
   transmitting a first pulse signal via a first line;
   transmitting a second pulse signal complementary to the first pulse signal via a second line, wherein the point in time of the transmitting of the second signal relative to the point in time of the transmitting of the first signal is varied as a function of respective digital data to be transmitted;
   sensing a voltage present between the first and second lines by a first device; and
   sensing a voltage indicating a change of the voltage present between the first and second lines by a second device;
   transmitting an output of the first device to a clock input of a flip-flop and an output of the second device to a data input of the flip-flop; and
   generating a voltage indicating the change of the voltage present between the first and second lines via a termination circuit.

2. The method according to claim 1, comprising wherein, with a first data to be transmitted, transmitting the first signal and the second signal simultaneously, or transmitting the second signal after the first signal.

3. The method according to claim 2, comprising wherein, with a second data to be transmitted which differs from the first data to be transmitted, transmitting the second signal prior to the first signal.

4. The method according to claim 3, comprising wherein, with the second data to be transmitted which differs from the first data to be transmitted, transmitting the second signal between 1 ns and 10 ns prior to the first signal.

5. The method according to claim 2, comprising wherein, with the first data to be transmitted, corresponding clock edges of the first signal and of the second signal occur simultaneously, or the clock edges of the second signal each occur after corresponding clock edges of the first signal.

6. The method according to claim 3, comprising wherein, with a second data to be transmitted which differs from the first data to be transmitted, the clock edges of the second signal each occur before corresponding clock edges of the first signal.

7. A signal demodulation device comprising:
   a system module configured to transmit a first pulse signal via a first line, and transmit a second pulse signal complementary to the first pulse signal via a second line, wherein the point in time of the transmitting of the second signal relative to the point in time of the transmitting of the first signal is varied as a function of respective digital data to be transmitted;
   a first device for sensing a voltage present between the first and second lines;
   a second device for sensing a voltage indicating a change of the voltage present between the first and second lines;
   a flip flop, wherein a clock input of the flip-flop is connected to the first device and a data input of the flip-flop is connected to the second device; and
   a termination circuit for generating the voltage indicating a change of the voltage present between the first and second lines.

8. The signal demodulation device according to claim 7, comprising wherein the first and/or second device comprise receiver circuits.

9. The signal demodulation device according to claim 7, comprising wherein a capacitor and/or an inductor is/are provided for generating the voltage indicating a change of the voltage present between the first and second lines.

10. The signal demodulation device according to claim 9, comprising wherein the capacitor and/or the inductor are part of the termination circuit.

11. A signal modulation device comprising:
    a system module configured to transmit a first pulse signal via a first line, and transmit a second pulse signal complementary to the first pulse signal via a second line, wherein the point in time of the transmitting of the second signal relative to the point in time of the transmitting of the first signal is varied as a function of respective digital data to be transmitted; and
    a delay device configured to vary the point in time of transmission of the second signal relative to the point in time of transmission of the first signal as a function of the respective digital data to be transmitted;
    a flip-flop having a clock input, a data input and first and second data outputs;
    a first driver circuit having an input for receiving a clock signal and an inverting output coupled to an input of the delay device;
    a second driver circuit having an input for receiving the clock signal and an output coupled to the clock input of the flip-flop.

12. A system, comprising:
    a system module configured to transmit a first pulse signal via a first line, and transmit a second pulse signal complementary to the first pulse signal via a second line, wherein the point in time of the transmitting of the second signal relative to the point in time of the transmitting of the first signal is varied as a function of respective digital data to be transmitted;
    a first device for sensing a voltage present between the first and second lines;
    a second device for sensing a voltage indicating a change of the voltage present between the first and second lines;
    a flip flop having a clock input and a data input, wherein the clock input is connected to the first device and the data input is connected to the second device.

13. The system according to claim 12, comprising:
a termination circuit for generating the voltage indicating a change of the voltage present between the first and second lines.

14. The system according to claim 13, comprising wherein the termination circuit is adapted to the impedance of the lines.

15. A system for transmission of differential signals comprising:
   a first line;
   a second line;
   a system module configured to transmit a first pulse signal via a first line, and transmit a second pulse signal complementary to the first pulse signal via a second line, wherein the point in time of the transmitting of the second signal relative to the point in time of the transmitting of the first signal is varied as a function of respective digital data to be transmitted;
   a first device for sensing a voltage present between the first and second lines;
   a second device for sensing a voltage indicating a change of the voltage present between the first and second lines;
   a flip flop, wherein a clock input of the flip-flop is connected to the first device and a data input of the flip-flop is connected to the second device; and
   a capacitor and/or an inductor connected between the first and second lines for generating the voltage indicating a change of the voltage present between the first and second lines.

16. The signal modulation device according to claim 15, further comprising a flip-flop.

17. The system according to claim 15, comprising wherein, with a first data to be transmitted, the first signal and the second signal are transmitted simultaneously, or the second signal is transmitted after the first signal.

18. The system according to claim 17, comprising wherein, with a second data to be transmitted which differs from the first data to be transmitted, the second signal is transmitted prior to the first signal.

19. The system according to claim 18, comprising wherein, with the second data to be transmitted which differs from the first data to be transmitted, the second signal is transmitted between 2 ns and 6 ns prior to the first signal.

20. The system according to claim 18, comprising wherein, with the first data to be transmitted, corresponding clock edges of the first signal and of the second signal occur simultaneously, or the clock edges of the second signal each occur after corresponding clock edges of the first signal.

21. The system according to claim 20, comprising wherein, with a second data to be transmitted which differs from the first data to be transmitted, the clock edges of the second signal each occur before corresponding clock edges of the first signal.

* * * * *